United States Patent [19]

Aske

[11] Patent Number: 4,488,445
[45] Date of Patent: Dec. 18, 1984

[54] INTEGRATED SILICON ACCELEROMETER WITH CROSS-AXIS COMPENSATION

[75] Inventor: Vernon H. Aske, Minnetonka, Minn.

[73] Assignee: Honeywell Inc., Minneapolis, Minn.

[21] Appl. No.: 546,258

[22] Filed: Oct. 28, 1983

[51] Int. Cl.³ .............................................. G01P 15/12
[52] U.S. Cl. .................................... 73/517 R; 73/514; 338/46
[58] Field of Search ............. 73/516 R, 517 R, 517 B, 73/514; 338/46, 47

[56] References Cited

U.S. PATENT DOCUMENTS 4,071,838 1/1978 Block ................................ 73/517 R

FOREIGN PATENT DOCUMENTS 534694 1/1977 U.S.S.R. ............................ 73/517 R

Primary Examiner—James J. Gill
Attorney, Agent, or Firm—George W. Field

[57] ABSTRACT

An accelerometer comprising a sheet of silicon configured as an inertia plate separate from a support plate except at a pair of flexure sites spaced along an axis, each flexure site including a pair of flexures mutually offset so that upon acceleration in a direction perpendicular to the inertia plate the flexures partake of compound bending, and stress responsive resistors at said flexures positioned so that upon compound bending the resistors change resistance in the opposite sense.

5 Claims, 6 Drawing Figures

INTEGRATED SILICON ACCELEROMETER WITH CROSS-AXIS COMPENSATION

TECHNICAL FIELD

This invention relates to the field of instruments for measuring linear accelerations, particularly accelerations of small magnitude.

BACKGROUND OF THE INVENTION

Devices responsive to linear acceleration perform essential sensing functions in a wide variety of systems. As performance requirements and available technology have advanced, the demand has increased for sensors characterized by much improved sensitivity, stability, accuracy, linearity of response, reliability, and ruggedness, in addition to fast reaction time, minimum cross-coupling, small size, and low cost. Implicit in the stability, sensitivity, and linearity requirements is a requirement that precision be maintained over a wide temperature range. The present state of the art is such that it has been difficult to achieve improvements in all of the foregoing characteristics simultaneously, or, in some instances, even to achieve improvement in one characteristic without adversely affecting another. Nevertheless, requirements exist, particularly in aircraft navigation and missile guidance systems, for an acceleration sensor with superior performance in all the noted areas.

In my co-pending patent application, Ser. No. 486,144, filed April 18, 1983, and assigned to the assignee of the present application, I disclose an accelerometer structure which minimizes bias instability, and reduces cross-coupling errors, by use of a sensing capsule including as a pendulum a sheet of silicon, supported at flexures across opposites faces of which are implanted strain sensitive resistors, so that as the pendulum moves in response to accelerations, the sensors detect the actual departure of the system from its physical null.

In use, the acceleration being sensed is applied in a direction which torques the pendulum about its flexures, so that the sensors on one surface increase in resistance when those on the opposite surface decrease in resistance, and vice versa. The resistances are connected in bridge circuits and the bridge outputs are responsive to the actual stresses in the flexures, and hence to the actual displacement of the flexures from mechanical null.

If the device is subject to accelerations orthogonal to that intended, the upper and lower resistors of each flexure are varied in the same sense, and no bridge unbalance occurs. Thus the system operation is made substantially independent of accelerations orthogonal to that desired, and cross-coupling is reduced.

The system described above has a disadvantage in that it requires diffusion or implantation of strain sensitive resistors at particular places on both surfaces of the sheet of silicon forming the pendulum. Processing on both surfaces of the material is difficult and expensive due to the necessity of careful registration between the upper and lower masks, and the problem of protecting one surface while the other is being worked on.

BRIEF SUMMARY OF THE INVENTION

The present invention makes possible the use of a silicon pendulum requiring processing only on one surface, by providing two flexures at each flexure area, the flexures being in offset pairs so that each is forced to partake of a compound bending such that one area is in compression as the other is in tension, the areas being at the same surface of the material. Then the use of a bridge circuit makes it possible to distinguish on axis accelerations from unwanted accelerations orthogonal thereto.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals identify corresponding parts throughout the several views.

DESCRIPTION OF THE PREFERRED EMBODIMENT

Figure 1:
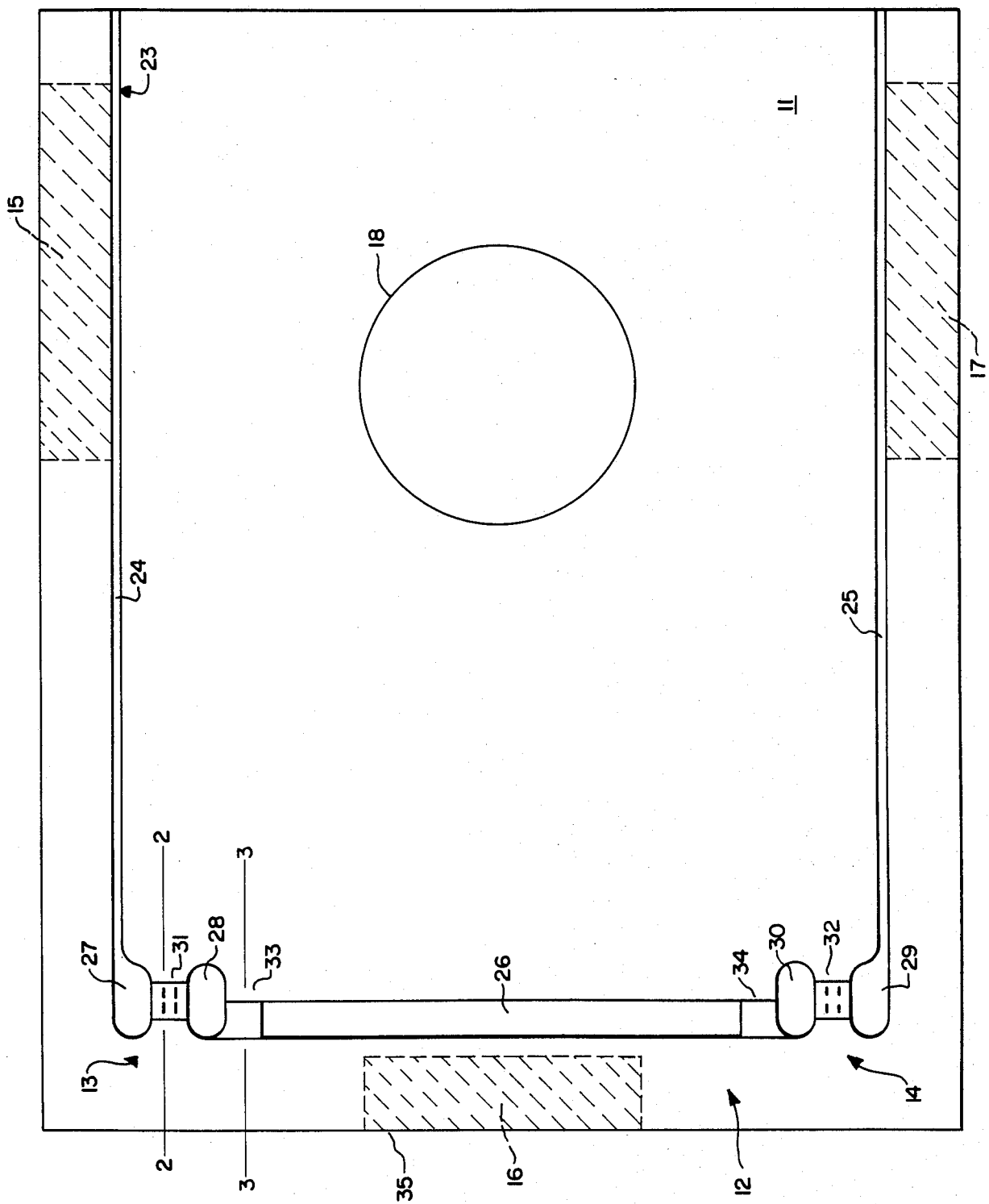
FIG. 1 is a plan view of a pendulum unit according to the invention.

In FIG. 1 a pendulum unit 10 according to the invention is shown to comprise an inertia plate 11 coplanar with and substantially enclosed by a U-shaped supporting plate 12 with which it is continuous at a plurality of aligned flexure sites 13 and 14. The supporting plate may be suitably mounted at areas indicated at 15, 16, and 17. A bobbin 18 is carried by inertia plate 11 for mounting a rebalance coil as described in my co-pending application.

Unit 10 comprises a sheet or substrate 20 of single-crystal p-silicon of the desired size cut and polished to a desired thickness such as 10 mils. Supported on one face of this substrate by an etch stop layer 21, is an epitaxially grown layer 22 of n-silicon about 1 mil in thickness.

Figure 2:
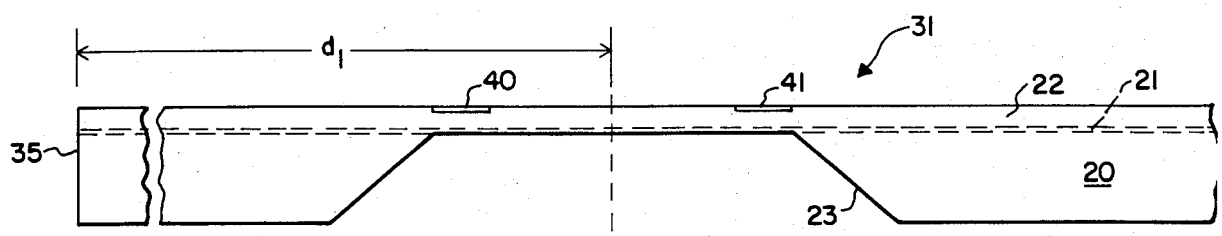
FIGS. 2 and 3 are fragmentary sectional views along the lines 2—2 and 3—3 of FIG. 1 respectively, to a larger scale.
Figure 3:
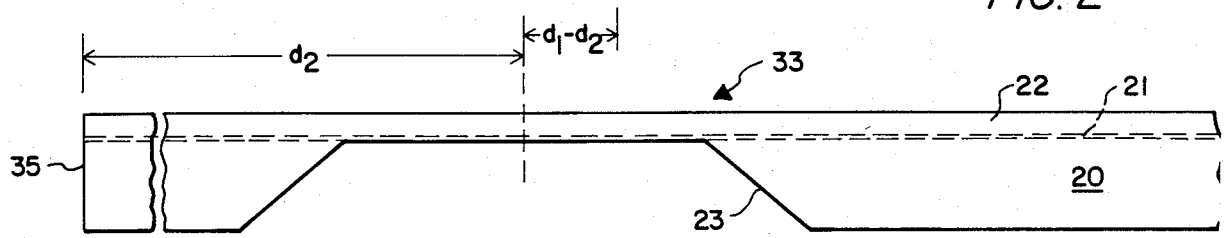

By a controlled electro-etching process the substrate is etched in a pattern shown in FIG. 1 to comprise a U-shaped groove 23 between plates 11 and 12, the groove being interrupted at sites 13 and 14. Those sites are chemically protected and the etching is continued until the groove becomes a slot passing entirely through the sheet or stops at the etch stop and is subsequently cut with a laser except at the protected sites, and including narrow lateral portions 24 and 25, a broader transverse central portion 26, spaced apertures 27 and 28 at site 13, and spaced apertures 29 and 30 at site 14. The spaced apertures define outward flexures 31 and 32 and inward flexures 33 and 34 which are mutually offset as will now be described, referring to FIGS. 2 and 3.

Figure 6:
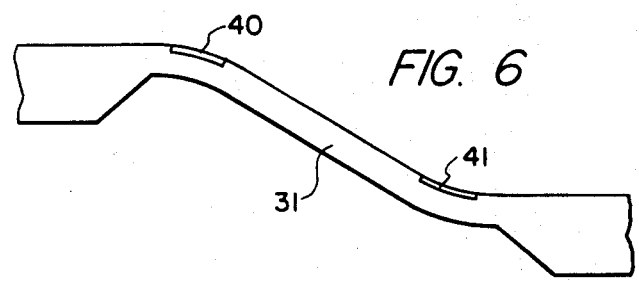
FIG. 6 is a view generally like FIG. 2 showing a different condition of the apparatus.

At site 13, flexure 31 is spaced from the edge 35 of plate 12 by a distance $d_1$, and flexure 33 is spaced from the edge of the plate by a distance $d_2$, so that the flexures are offset mutually by a distance $d_1-d_2$. The same arrangement is provided at site 14. It will be evident that if inertia plate 11 is acted on by an acceleration normal to the plate, flexures 31, 32, 33, and 34 will not bend in a simple curve, but will partake of a compound bending motion as shown diagramatically for flexure 31 in FIG. 6, a first portion of the upper surface of the flexure being in tension while a second portion of the upper surface is in compression.

Figure 4:
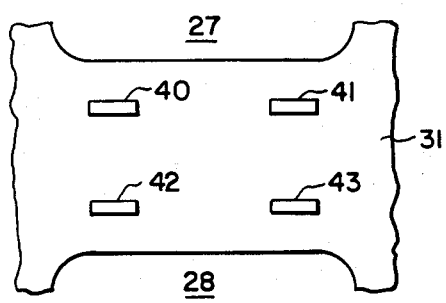
FIG. 4 is a greatly enlarged plan view of a portion of FIG. 1.
Figure 5:
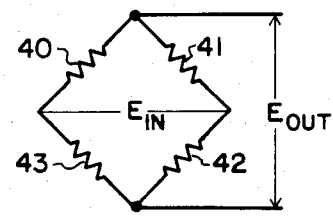
FIG. 5 is a wiring diagram relating to the invention.

A plurality of strain sensitive resistors are implanted on the upper surface of flexure 31, as shown at 40, 41, 42, and 43 in FIG. 4, and the upper surface of flexure 32 is similarly implanted. The resistances are interconnected in bridge circuits, as shown for flexure 31 in FIG. 5. Thus, accelerations normal to plate 31 result in differential variation in the resistances of resistor 40-43 and a corresponding bridge output. On the other hand, accelerations orthogonal to that desired and hence parallel to plate 31 cause stress of the same sense in all the bridge resistances, and no bridge output results.

The space on the surface of plate 11 around bobbin 18 is available for large scale integration electronics.

From the above it will be evident that I have invented a silicon accelerometer in which strain sensitive resistors may be diffused or implanted on a single surface of the silicon without loss of freedom from cross-axis coupling of accelerations.

Numerous characteristics and advantages of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim:

1. In an accelerometer, in combination:
   a pendulum unit comprising an inertia plate separate from a support plate except at a pair of flexure sites spaced along a flexure axis, each flexure site including an inward flexure and an outward flexure mutually offset so that an input acceleration of the unit in a direction perpendicular to said inertia plate produces compound bending in said flexures;
   a pair of strain responsive resistors carried by one surface of one of said flexures and positioned so that upon said compound bending the resistances of each pair are subject to physical strains of opposite senses, while upon accelerations in directions orthogonal to said input acceleration both resistors of said pair are subject to physical strains in the same sense; and
   means electrically interconnecting said resistors to give an output which varies with differential changes in the resistances of said resistors.

2. In an accelerometer, in combination:
   a pendulum unit comprising an inertia plate separate from a support plate except at a pair of flexure sites spaced along a flexure axis, each flexure site including an inward flexure and an outward flexure mutually offset so that an input acceleration of the unit in a direction perpendicular to said inertia plate produces compound bending in said flexures;
   a pair of strain responsive resistors carried by one surface of one of said flexures at each flexure site and positioned so that upon said compound bending the resistances of each pair are subject to physical strains in opposite senses, while upon accelerations in directions orthogonal to said input acceleration both resistors of each said pair are subject to physical strains in the same sense; and
   means interconnecting said resistors in a bridge circuit to give an output which varies with differential changes in the resistances of said resistors.

3. In an accelerometer, in combination:
   a pendulum unit comprising an inertia plate continuous with a support plate at a pair of flexure sites spaced along a flexure axis, each flexure site including an inward flexure and an outward flexure mutually offset in a direction parallel to the plane of the plate so that an input acceleration of the unit in a direction perpendicular to said inertia plate produces compound bending in said flexures;
   a plurality of strain sensitive resistors carried by one surface of one of said flexures and positioned so that upon said compound bending at least one resistor in said plurality increases in resistance and at least one other resistor in said plurality decreases in resistance, while upon accelerations in directions orthogonal to said input acceleration said resistances vary in the same sense; and
   means connecting the resistances in said plurality to comprise a resistance bridge which gives an output varying with differential changes in the resistances of said resistors.

4. In an accelerometer, in combination:
   a pendulum unit comprising an inertia plate continuous with a support plate at a pair of flexure sites spaced along a flexure axis, each flexure site including an inward flexure and an outward flexure mutually offset in a direction parallel to the plane of the plate, so that an input acceleration of the unit in a direction perpendicular to said inertia plate produces compound bending in said flexures;
   a plurality of strain responsive resistors carried by one surface of one of said flexures at each said flexure site and positioned so that upon said compound bending at least one resistor in each said plurality increases in resistance and at least one resistor in each said plurality decreases in resistance, while upon accelerations in directions orthogonal to said input acceleration said resistances at each flexure site vary in the same sense; and
   means interconnecting the resistances in each plurality to comprise a resistance bridge which gives an output varying with differential changes in the resistances of the resistors making up the bridge.

5. An accelerometer comprising a sheet of silicon configured as an inertia plate separate from a support plate except at a pair of flexure sites spaced along an axis, each flexure site including a pair of flexures mutually offset so that upon acceleration in a direction perpendicular to the inertia plate the flexures partake of compound bending, and stress responsive resistors at said flexures positioned so that upon compound bending the resistors change resistance in the opposite sense.

* * * * *